March 28, 1967  J. E. HEIDER  3,311,684
METHOD FOR BLOW MOLDING THERMOPLASTIC ARTICLES
Filed Sept. 3, 1963  5 Sheets-Sheet 1

INVENTOR.
JAMES E. HEIDER
BY Philip M. Rice
& W. A. Schaich
ATTORNEYS

INVENTOR.
JAMES E. HEIDER
BY Philip M. Rice
& W. A. Schaich
ATTORNEYS

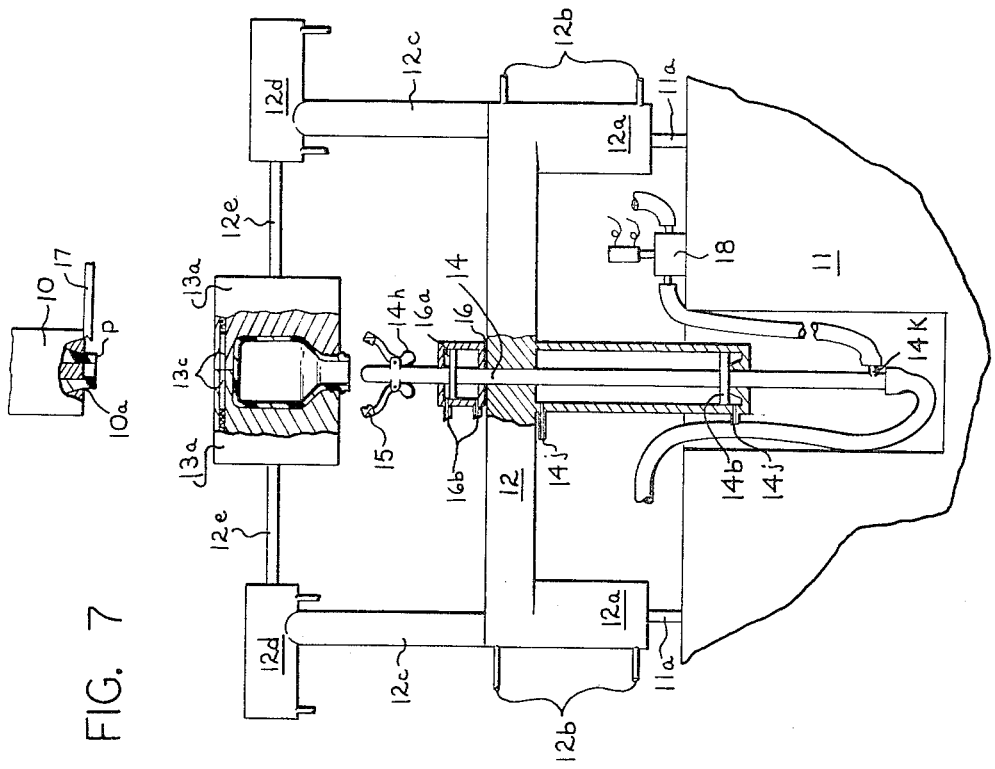
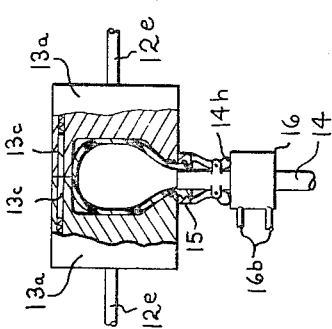

March 28, 1967 J. E. HEIDER 3,311,684
METHOD FOR BLOW MOLDING THERMOPLASTIC ARTICLES
Filed Sept. 3, 1963 5 Sheets-Sheet 4

INVENTOR.
JAMES E. HEIDER
BY
ATTORNEYS

March 28, 1967 J. E. HEIDER 3,311,684
METHOD FOR BLOW MOLDING THERMOPLASTIC ARTICLES
Filed Sept. 3, 1963 5 Sheets-Sheet 5
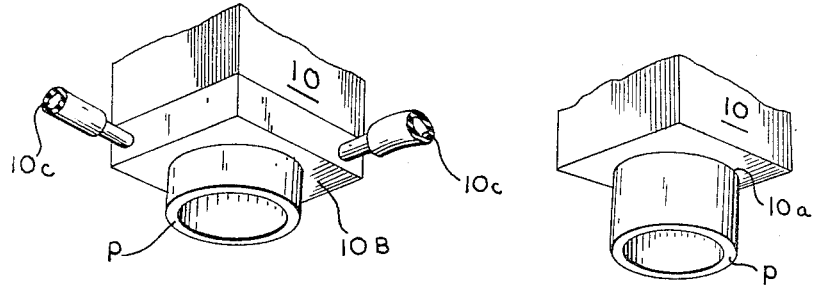
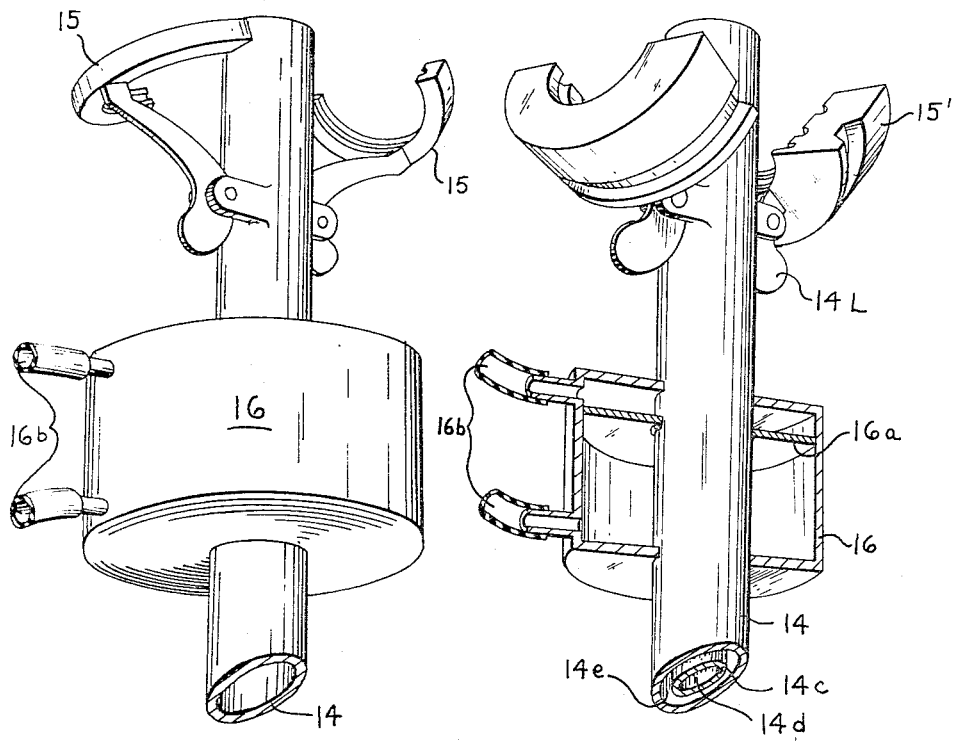
FIG. 11    FIG. 9
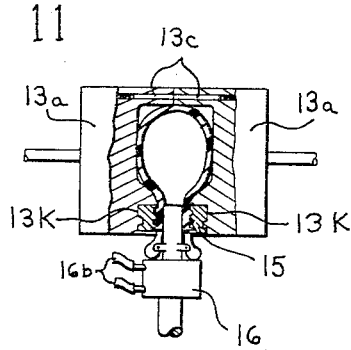
FIG. 10
INVENTOR.
JAMES E. HEIDER
BY
ATTORNEYS

United States Patent Office 3,311,684
Patented Mar. 28, 1967

3,311,684
METHOD FOR BLOW MOLDING THERMO-
PLASTIC ARTICLES
James Elmer Heider, Toledo, Ohio, assignor to Owens-
Illinois, Inc., a corporation of Ohio
Filed Sept. 3, 1963, Ser. No. 306,056
1 Claim. (Cl. 264—99)

This invention relates to an improved method for blow molding hollow thermoplastic articles, and more particularly to a method of producing stress orientation in the walls of such blow molded plastic article.

It is well known that the tensile strength of a large variety of thermoplastic materials can be substantially increased by the technique of stress orientation. Note for example, the disclosures of U.S. Patent No. 2,919,462 to J. H. Friden and U.S. Patent No. 3,074,108 to F. E. Wiley et al.

The Wiley et al. patent discloses a method and conditions necessary for producing biaxial stress orientation in thermoplastic film and hence is obviously inapplicable to the blow molding of conventional hollow plastic articles which require relatively thick wall sections, such as bottles, jars, toys, industrial objects, doll bodies and the like.

The Friden patent discloses a technique and conditions for producing stress oriented hollow plastic containers but Friden's technique is not commercially practicable since it involves first the formation of a continuous length of plastic tubing which is led through an elaborate cooling procedure to produce the proper temperature conditions, then is cut into lengths for the subsequent stress orientation steps.

It is an object of this invention to provide an improved method for the formation of stress oriented thermoplastic containers and similar hollow articles which may be carried out on commercially available blow molding machines without any substantial modification of such machines or impairment of the operating efficiency and productive rates of such machines.

A further object of this invention is to provide an improved method of blow molding hollow thermoplastic articles by the so-called "free extrusion process" wherein a tubular formation of thermoplastic material is freely extruded through an orifice to form a parison which is subsequently expanded in a blow mold, the specific improvement comprising the steps of inducing either or both axial and radial stress orientation in the wall portions of the resulting plastic article by stretching or expanding operations on the thermoplastic parison.

A specific object of this invention is to provide a method of blow molding stress oriented hollow thermoplastic articles from a heated tubular formation of thermoplastic material freely extruded through an orifice wherein the freely extruded tubular formation is grasped at two axially spaced positions, one of such positions being adjacent the leading end of the formation, then the portion of the tubular formation intermediate the grasping position is cooled to substantially the crystallization temperature of the thermoplastic material; thereafter, the grasped leading end of the cooled portion is moved relative to the grasped trailing end to stretch the chilled portion and produce an axial stress oriented parison and subsequently, if desired, radial stress orientation is accomplished by expanding the parison in a blow mold.

Another object of this invention under a modified embodiment is to provide a method of blow molding stress oriented hollow thermoplastic articles from a tubular formation of thermoplastic which is freely extruded through an orifice at substantially the crystallization temperature of the thermoplastic material wherein the freely extruded tubular formation is grasped at two axially spaced positions, one of such positions being adjacent the leading end of the formation, then the grasped leading end of the tubular formation is moved relative to the grasped trailing end to stretch said tubular formation and produce an axial stress oriented parison and subsequently, if desired, radial stress orientation is accomplished by expanding the parison in a blow mold.

The specific nature of this invention, as well as other objects and advantages thereof, will become apparent to those skilled in the art from the following detailed description, taken in conjunction with the annexed sheets of drawings on which:

FIGURE 5 is an elevational view of the blow molding portion of the equipment shown in FIGURES 2 through 4, illustrating the beginning of the radial expansion of the parison, prior to closure of the blow molds thereon;

FIGURE 6 is a view similar to FIGURE 5 but illustrating the further radial expansion of the parison within the closed blow mold;

FIGURE 7 is a view similar to FIGURE 2 but illustrating the position of the machine elements at the completion of the blow molding operation;

FIGURE 9 is a view similar to FIGURE 1 but illustrating the modified tube grasping elements of FIGURE 8;

FIGURE 10 is a view similar to FIGURE 6 illustrating the final position of the blow mold when operated with the modified grasping mechanism of FIGURE 9;

FIGURE 11 is a view similar to FIGURE 1 illustrating another embodiment of the present invention.

Figure 2:
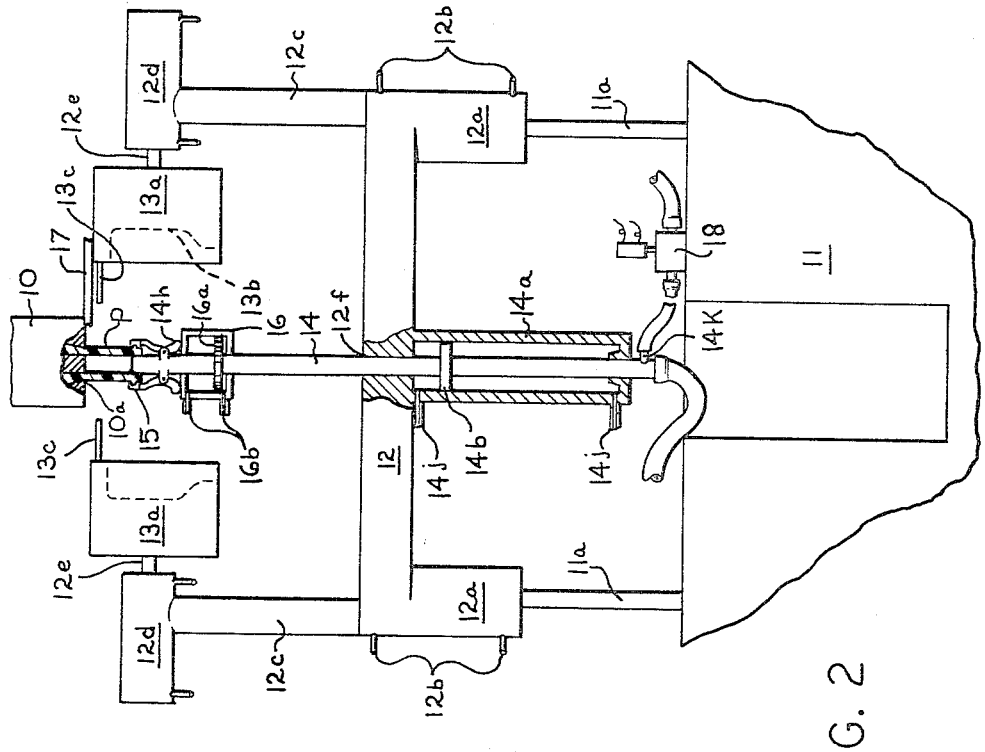
FIGURE 2 is a schematic elevational view, partly in section, of a complete machine capable of carrying out the method of this invention showing the position of the elements of the machine at the beginning of the operating cycle wherein the end of the freely extruded thermoplastic tube is grasped by the grasping mechanism.

Referring to FIGURE 2, there is schematically illustrated a well known form of plastic blow molding machine comprising an extruder (not shown) having an orifice block 10 defining an annular orifice 10a through which a tubular formation of heated thermoplastic material P is issued, either continuously or intermittently as required by the operation of the machine. The orifice block 10 overlies a machine base portion 11 on which are mounted a plurality of upstanding piston rods 11a. Each of the piston rods 11a cooperates with a hydraulic cylinder 12a which are respectively provided on opposite lateral ends of a mold support base 12. Suitable hydraulic connections 12b are provided for each of the cylinders 12a so that the mold support base 12 may be moved vertically relative to the extrusion orifice 10a at desired times in the cycle of operation of the machine.

Upstanding columns 12c are provided at each lateral extremity of the mold base 12 and the top of such columns respectively mount horizontal mold actuating cylinders 12d. Cylinders 12d are respectively provided with piston rods 12e and on the free end of each such rod is mounted one-half segment 13a of a blow mold which, when in their closed position, define a cavity 13b corresponding to the configuration of the desired plastic article.

Figure 1:
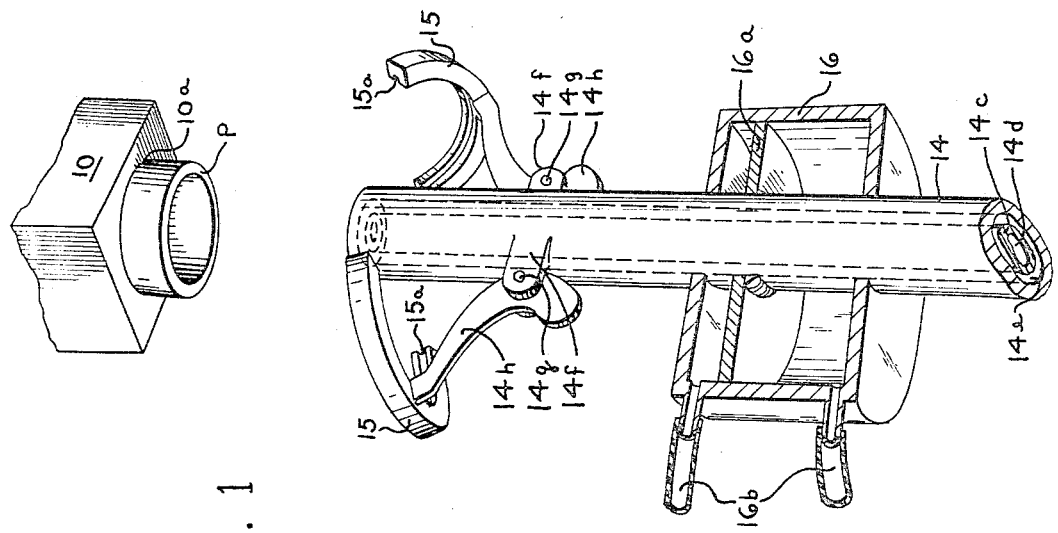
FIGURE 1 is a schematic perspective view of a tube grasping apparatus capable of grasping of the leading end of a freely extruded tubular formation of thermoplastic material.

The mold support base 12 is provided with a vertical aperture 12f which is coaxially aligned with the extrusion orifice 10a. An elongated support rod 14 forming part of the tube grasping mechanism is slidably journaled in vertical aperture 12f and is vertically reciprocated by a cylinder 14a secured in depending relationship to the mold support base 12. A piston 14b is secured to rod 14 within cylinder 14a. Suitable hydraulic fluid connections 14j are provided to control the vertical portion of piston 14b. As is more clearly shown in FIGURE 1, the rod 14 is hollow and houses a fluid conduit 14c which is smaller in diameter than the bore of the hollow rod 14, thus providing two concentric annular fluid passages 14d and 14e. These two concentric fluid passages permit both the supply and exhaust of blowing or cooling fluid to the plastic parison in a manner that will be described in more detail later.

Adjacent the top of the support rod 14 is provided a pair of diametrically disposed lugs 14f which are traversed by pivot pins 14g. A camming lever 14h is mounted on each of the pivot pins 14g and the top free ends of the camming levers 14h respectively carry semi-circular tube grasping rings 15. In the embodiment of this invention illustrated in FIGURE 1, grasping rings 15 define a channel 15a into which the plastic is squeezed when the rings 15 are shifted to their tube grasping position. In the modification of this invention illustrated by FIGURES 8, 9, and 10, the rings 15′ comprise neck ring mold halves of a container.

In either case, the grasping rings are actuated by a cylinder 16 which is slidably mounted on support rod 14 and hydraulically cooperates with a piston 16a which is fixedly secured to support rod 14. Suitable hydraulic connections 16b are provided for cylinder 16 so as to permit the cylinder to be raised and lowered relative to the camming levers 14h at the desired times in the cycle of operation of the machine, engaging the rounded ends of such levers. When the cylinder 16 is elevated into contact with the support levers 14h, these levers are cammed to bring the two grasping rings 15 into their closed position. When the cylinder 16 is lowered or retracted relative to the camming levers 14h, the camming levers 14h return to the position shown in FIGURE 1. If desired, torsion springs (not shown) can be provided to insure that the levers 14h will return to the position of FIGURE 1.

Lastly, the mold halves 13a are respectively provided with tube grasping elements 13c which may simply constitute plate-like elements slidably mounted in a suitable recess in the top portion of the respective mold half 13a and spring pressed by a suitable spring 13b (FIGURE 8) so as to project beyond the mating face of the respective mold half 13a. Thus, as the mold halves 13a are moved toward their closed position, the edges of the two grasping plates 13c will contact each other substantially in advance of the molds reaching their closed position, yet the molds may be closed without interference from the two grasping plates due to their resilient mounting on their respective mold halves. A conventional tube severing knife 17 is provided which is actuated by a hydraulic cylinder (not shown) in conventional fashion to wipe across the orifice 10a and thus sever an extruded length of tube from the oncoming plastic.

According to the method of this invention, a relatively short length of heated thermoplastic material P is extruded from orifice 10a as a tubular formation and the leading end of such formation is grasped and engaged around a blowing nozzle. A trailing portion of the heated tubular plastic formation is then engaged and pinched at a position axially spaced from the grasped leading end of the formation. Concurrently with the pinching action, the extruded formation is cut off and isolated from the oncoming plastic in the extrusion orifice. Then cooling fluid is circulated through the interior of the grasped tubular formation to quickly cool such formation to the so-called crystallization temperature, which as is well known in the prior art, is the temperature at which stretching of the thermoplastic material will result in stress orientation effects. The axial stretching of the grasped tubular formation is accomplished by advancing the grasped leading end of the formation relative to the grasped trailing end of the formation. The axially stretched, grasped formation is then enclosed in a blow mold and is radially expanded by the introduction of pressured fluid to conform to the blow mold cavity and concurrently induce radial stress orientation in the thermoplastic material. The crystallization temperature varies, of course, for the various types of thermoplastic material but this property is well known in the art, as indicated by the disclosures of the Wiley et al. and Friden patents previously referred to.

To operate the machine elements illustrated in the drawings and heretofore described in accordance with the method of this invention, reference should be first had to FIGURE 2 wherein the machine elements are in their initial positions for the start of an operating cycle. In this position, a short length of thermoplastic tubing P has been extruded from extrusion orifice 10a and the leading end of such formation has been grasped by the tube grasping rings 15 which were actuated to their closed position by the upward movement of cylinder 16.

Figures 3, 4:
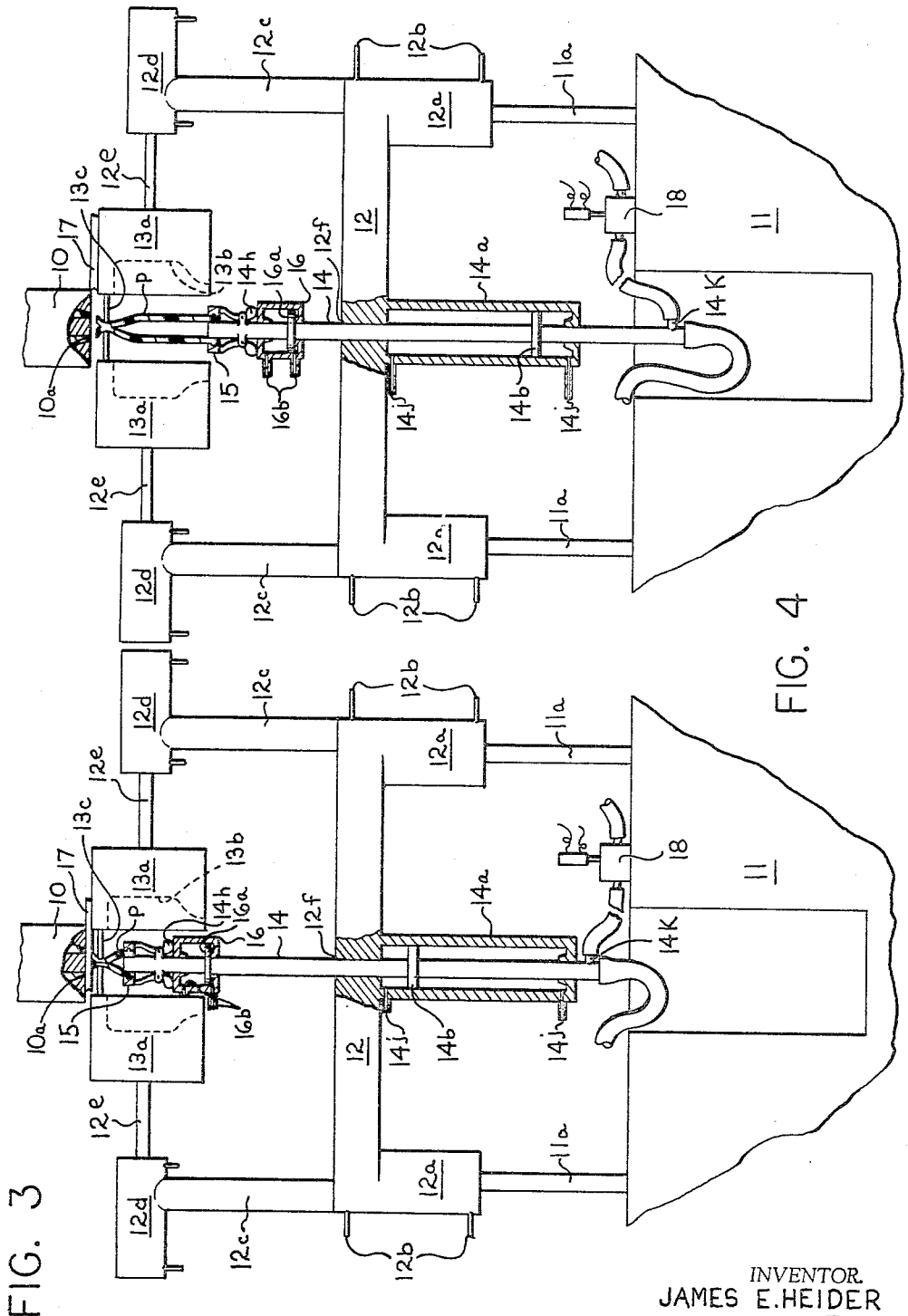
FIGURE 3 is a view similar to FIGURE 2 in illustrating the next step of the process embodying this invention, wherein the grasped tubular formation is grasped at its trailing portion and isolated from the extrusion orifice for cooling purposes.
FIGURE 4 is a view similar to FIGURE 2 but illustrating the next step of the process embodying this invention wherein the grasped thermoplastic formation is axially stretched to produce the desired degree of axial stress orientation.

Referring now to FIGURE 3, the mold halves 13a are then advanced toward their closed position so that the projecting ends of the tube grasping plates 13c engage and pinch the trailing end of the extruded tubular plastic formation. Concurrently with such engagement, the severing knife 17 is rapidly reciprocated across the extrusion orifice 10a to completely isolate the grasped formation from the oncoming plastic in the orifice.

Concurrently with the tube severing, the mold table 12 is moved downwardly by actuation of cylinders 12a so as to space the mold halves 13a relative to the extrusion orifice 10a and permit continuous extrusion of plastic through the orifice if such is desired.

Air or other cooling fluid is then admitted through the passageway 14d of the fluid conduit 14c of the support rod 14 and is circulated around the cavity defined by the grasped plastic parison which is sealed at its leading end of the support rod 14 and at its trailing end by the grasping plates 13c. To promote the cooling action, the cooling fluid is exhausted through the other fluid passageway 14e contained in the support rod 14 and the rate of such exhaust is controlled by a hydraulically actuated valve 18 which is suitably connected to the bottom end of conduit 14c by a pipe 14k. If desired, cooling air may also be blown on the exterior of the grasped parison.

When the grasped plastic parison is cooled to the crystallization temperature appropriate for the particular thermoplastic material, actuating fluid is supplied to the hydraulic cylinder 14a to move the support rod 14 downwardly at a substantially greater rate than the downward movement of the mold halves of the mold support table 12. This will result in an axial stretching of the plastic parison bringing it to the position illustrated in FIGURE 4.

Either at this point, concurrently therewith, or subsequently, the exhaust control valve 18 may be actuated to produce a positive fluid pressure within the plastic parison so that, if desired, some degree of radial expansion of the plastic parison may be produced prior to closing of the blow mold halves 13a, as illustrated in FIGURE 5. The blow mold halves are then closed and the radial expansion of the parison is completed by the introduction of pressured fluid through conduit 14c. When the expansion is completed, exhaust valve 18 is again opened to permit rapid circulation of the pressured fluid through the expanded plastic article and thus permit its further rapid cooling, if necessary, to a temperature at which it may be safely removed from the mold cavity 13b without risk of deformation or excessive shrinkage.

Figure 8:
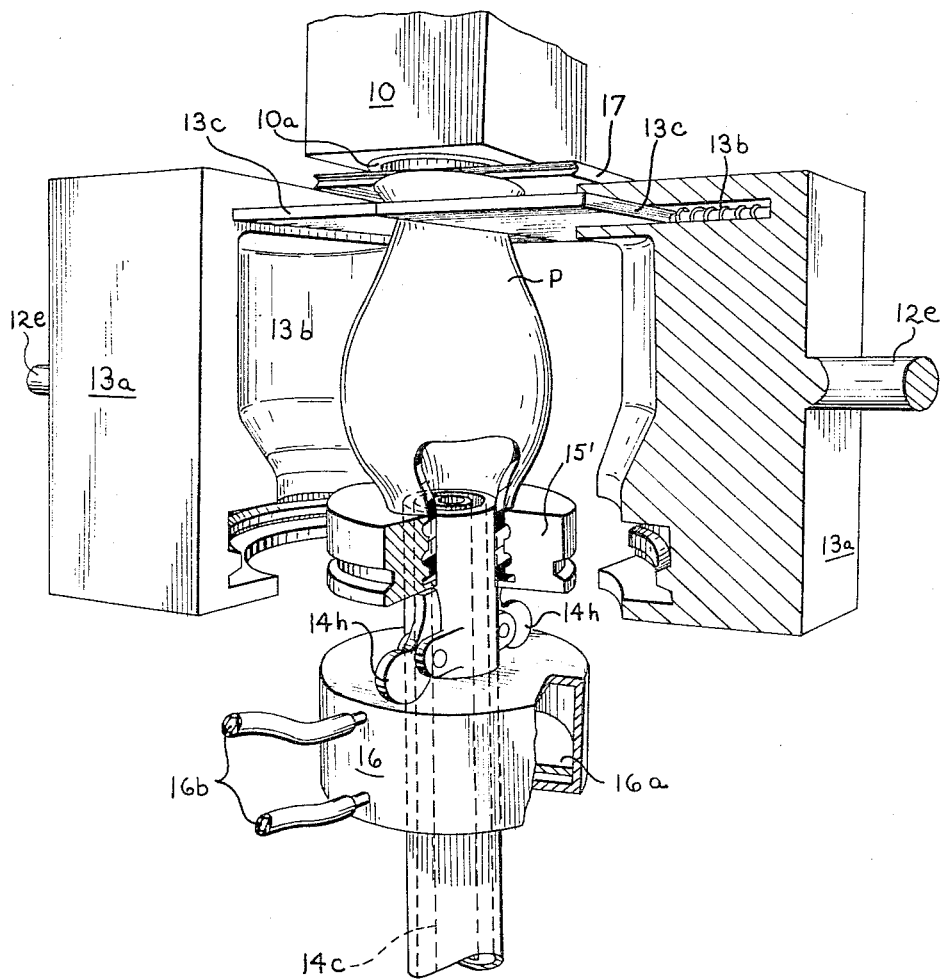
FIGURE 8 is an enlarged scale schematic perspective view illustrating a modified construction of the tube grasping elements showing the elements in their positions occupied as in FIGURE 5.

Referring to the modification of this invention illustrated in FIGURES 8, 9, and 10, the sequence of operations is identical to that heretofore described. The only difference is that the tube grasping rings 15' now compression mold the leading end of the tubular plastic formation around the top end of the support rod 14 to form the neck finish configuration desired on the finished plastic container. Accordingly, the mold cavity defined by the mold halves 13a is now provided with an annular recess 13k into which the grasping rings 15 snugly fit when the mold halves 13a are in their closed position, as illustrated in FIGURE 10. Obviously, the portion of the plastic formation which is compression molded by the grasping rings 15' in accordance with this modification of the invention is not subjected to stress orientation but this is relatively unimportant in that this portion of a typical plastic container generally has sufficient wall thickness so as to obviate the necessity for stress orientation to increase the tensile strength of this particular portion of the container.

Referring to the modification of this invention illustrated in FIGURE 11 the apparatus is identical to that shown in FIGURES 1 through 7 except that the orifice block 10 has attached thereto at its outlet end a cooling chamber 10b which cools the thermoplastic material to substantially its crystallization temperature prior to its extrusion from the orifice. Cooling fluid may be directed to the chamber 10b through suitable connections 10c. As a result of such cooling prior to extrusion, it is not necessary to provide cooling means through the support rod 14 as shown in FIGURES 1 through 7. Thus, the support rod 14 to which the two grasping rings 15 and the cylinder 16 are connected need have only a single fluid passage 14e to permit the entrance of pressured fluid for the purpose of effecting radial expansion of the parison. The method and the operation of the machine elements under this embodiment are identical with that previously described except that the cooling step may be omitted.

Other modifications of this invention will be readily apparent from the foregoing description of several preferred embodiments and it should be understood that the true scope of this invention is defined by the appended claim.

I claim:

In the method of blow molding hollow thermoplastic articles wherein a heated tubular formation of thermoplastic material is freely extruded through an orifice to form a parison which is subsequently expanded in a blow mold, the improvement comprising the steps of:

(1) grasping the freely extruded tubular formation at two axially spaced positions one of said positions being adjacent the leading end of the formation and the other at a trailing position relative thereto, said grasping at said trailing position pinching the tubing closed at that point to permit internal cooling of all of the tubing forwardly of the trailing position without substantial effect on the temperature of the following extruded thermoplastic material;

(2) severing the grasped tubular formation from the thermoplastic material issuing from the orifice;

(3) cooling the portion of the tubular formation intermediate the grasping portions to substantially the crystallization temperature of the thermoplastic material; and (4) moving the grasped leading end of said cooled portion in the direction of extrusion relative to the grasped trailing end, thereby stretching said cooled portion and producing an axial stress oriented parison.

References Cited by the Examiner

UNITED STATES PATENTS

| | | | |
|---|---|---|---|
| 2,919,462 | 1/1960 | Friden | 264—99 |
| 2,964,795 | 12/1960 | Schaich | 264—99 |
| 3,084,383 | 4/1963 | Figna | 264—98 |
| 3,125,619 | 3/1964 | Miller | 264—98 |

ROBERT F. WHITE, *Primary Examiner.*

A. R. NOE, *Assistant Examiner.*